United States Patent
Bademian et al.

(10) Patent No.: US 6,433,916 B1
(45) Date of Patent: Aug. 13, 2002

(54) OCTAVE SPECTRA ACOUSTO-OPTIC TUNABLE FILTER

(76) Inventors: Leon Bademian, 42 Montgomery Dr., Stafford, VA (US) 22554; Allister McNeish, 2217 Onion Creek Pkwy., Apt. 104, Austin, TX (US) 78747

(*) Notice: Subject to any disclaimer, the term of this patent is extended or adjusted under 35 U.S.C. 154(b) by 27 days.

(21) Appl. No.: 09/609,025

(22) Filed: Jun. 30, 2000

(Under 37 CFR 1.47)

Related U.S. Application Data
(60) Provisional application No. 60/141,282, filed on Jun. 30, 1999.

(51) Int. Cl.$^7$ .................................................. G02F 1/11
(52) U.S. Cl. ....................................... 359/285; 359/287
(58) Field of Search ................................ 359/256, 285, 359/305, 322, 323, 287

(56) References Cited

U.S. PATENT DOCUMENTS

| | | | |
|---|---|---|---|
| 3,655,265 A | * | 4/1972 | Hammond ................... 359/308 |
| 3,679,288 A | * | 7/1972 | Harris ......................... 359/314 |
| 5,909,304 A | | 6/1999 | Chang ......................... 359/308 |

* cited by examiner

*Primary Examiner*—Georgia Epps
*Assistant Examiner*—Gary O'Neill
(74) *Attorney, Agent, or Firm*—Greenberg Traurig

(57) ABSTRACT

A method for increasing the tunable range of a single acousto-optic tunable filter includes the steps of generating an active steering beam on a piezoelectric transducer and configuring the electrodes of the piezoelectric transducer to reduce the tuning frequency at short wavelengths and increasing the tuning frequency at long wavelengths. The piezoelectric transducer is mounted in relation with an optically transparent crystal at an angle such that the fixed launch angle in combination with the driving frequency provides a greater that one octave spectra to be filtered in a single AOTF.

16 Claims, 5 Drawing Sheets

OCTAVE SPECTRA ACOUSTO-OPTIC TUNABLE FILTER

This application is related to and claims the benefit of provisional application No. 60/141,282 filed Jun. 30, 1999, the teachings therein are hereby incorporated herein in their entirety.

FIELD OF THE INVENTION

The present invention relates generally to acousto-optic tunable filters, and more specifically, to non-collinear or transverse type acousto-optic tunable filters.

BACKGROUND OF THE INVENTION

The tuning range between the drive frequency and the selected wavelength in a conventional transverse acousto-optic tunable filter (AOTF) is limited to considerably less than an octave of wavelength for a frequency variation of one octave. As a consequence, a single AOTF device has a limited tunable spectral range and cannot cover a tunable range of, for example, but not limited to, a spectral range of 400 to 800 nanometers (nm), which includes the entire visible spectrum, or a similar tunable wavelength range at, for example, but not limited to, infrared wavelengths, in one AOTF device without using a frequency range greater than an octave. Further, using a frequency range greater than one octave in a conventional AOTF causes undesired spurious second harmonic responses. Thus, a design providing a tunable spectrum range greater than one octave without undesired harmonic responses typically requires use of multiple conventional AOTF devices, thereby increasing design complexity and requiring, among other things, greater power and physical surface area.

SUMMARY OF THE INVENTION

Therefore, it is a general object of the present invention to provide an apparatus and methods which increase the tunable wavelength range of a single AOTF device to greater than one octave without introducing undesired spurious harmonic responses.

A further general object of the present invention is to provide an apparatus and methods which allow a single AOTF device to have a tunable wavelength range comprising the entire visible light spectrum without introducing undesired harmonic responses.

The method for increasing the tunable range of a single acousto-optic tunable filter includes the steps of generating an active steering beam on a piezoelectric transducer and configuring the electrodes of the piezoelectric transducer to reduce the tuning frequency at short wavelengths and increasing the tuning frequency at long wavelengths. The piezoelectric transducer is mounted in relation with an optically transparent crystal at an angle such that the fixed launch angle in combination with the driving frequency provides a greater that one octave spectra to be filtered in a single AOTF.

These as well as other objects are apparent upon inspection of this specification the accompanying drawings.

DETAILED DESCRIPTION OF THE PREFERRED EMBODIMENTS

An Acousto-Optic Tunable Filter (AOTF) is a solid state device comprising an optically transparent crystal with an attached ultrasonic piezoelectric transducer. In operation, an AOTF is a device that diffracts a cone of light from one polarization to another by means of an acoustic wave in an anisotropic medium such as a birefringent crystal. Specifically, light passing through a birefringent crystal can be diffracted into a particular range of wavelengths by directing an RF signal onto a transducer designed to produce the desired wavelength response. The most important feature of an AOTF is that a narrow filter passband can be obtained for a large input cone angle of incident light. The present invention provides an apparatus and methods for modifying or increasing the tunable range of non-collinear or transverse type AOTFs.

The tuning relationship between the ultrasonic driving frequency and the selected wavelength in a transverse AOTF is described as a curve. The characteristic operating curve for a conventional AOTF device indicates that the tuning range of a conventional AOTF device is limited to less than an octave of wavelength for a driving frequency range of one octave. The tuning range between the drive frequency and the selected wavelength in a conventional transverse acousto-optic tunable filter (AOTF) is thereby limited to considerably less than an octave of wavelength for a frequency variation of one octave. As a consequence, a single AOTF device of conventional design has a limited tunable spectrum range and cannot cover a tunable spectrum range of, for example, but not limited to, 400 to 800 nanometers (nm) which includes the entire visible spectrum, in one AOTF device without using a frequency range greater than an octave. Further, using a frequency range greater than one octave can cause undesired spurious second harmonic responses.

The tuning relationship between the selected wavelength of the filtered light and the ultrasonic frequency applied to the piezoelectric transducer depends, among other factors, on the refractive index dispersion of the AOTF material. This dispersion gives rise to a non-linear tuning relationship. Further, AOTF tuning is also dependent on the acoustic launch angle (i.e., the angle with respect to the crystal axis at which the driving frequency is directed into the birefringent crystal).

Figure 1:
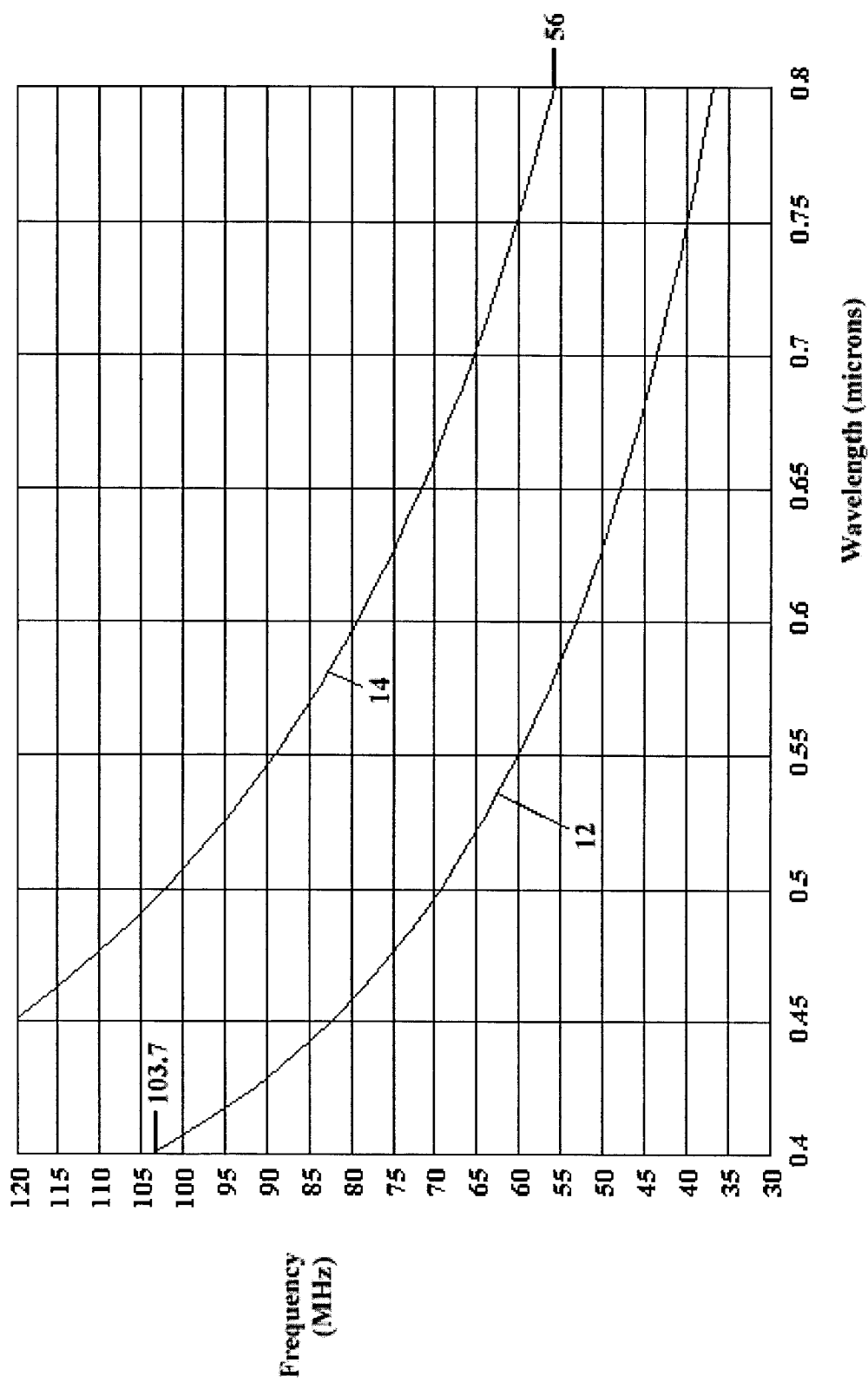
FIG. 1 shows the tuning relationships for a conventional AOTF operating between 400 nm and 800 nm at two different launch angles.

FIG. 1 shows the tuning relationships for a TeO₂ AOTF operating between 400 nm and 800 nm with two launch angles, 4.2° and 6.4°. An AOTF is optimized to a particular wavelength and tuning frequency range by choosing an appropriate acoustic launch direction, typically a few degrees from the [110] crystal axis (reference FIG. 4) in the [110]/[001] plane (reference FIG. 4) for an AOTF implemented using Tellurium Dioxide (TeO₂). If the acoustic beam is launched at a large angle relative to the crystal axis, the tuning frequencies are large compared to those obtained with a smaller acoustic launch angle. Choosing a larger acoustic angle therefore results in a higher frequency device for the same wavelength coverage. Typically, a launch angle of 4° is used for AOTF application at the blue end of the visible spectrum and a 6° angle at the red end of the spectrum. Referring to FIG. 1, the upper curve 14, is for a 6.4° acoustic launch angle and the lower curve 12, for a 4.2° angle. As can be seen from FIG. 1, a 4.2° AOTF tunes to 400 nm at 103.7 MHz whereas a 6.4° AOTF tunes to 800 nm at 56 MHz. Thus, the tuning range between the drive frequency and the selected wavelength in a conventional transverse acousto-optic tunable filter (AOTF) is limited to considerably less than an octave of wavelength for a frequency variation of one octave.

Further, if a conventional AOTF is operated over a frequency range greater than one octave, harmonics of the driving frequency created either by non-linear Bragg diffraction (e.g., second order diffraction) or by the drive amplifier results in the undesirable selection of spurious wavelengths.

Acoustic beam steering is a technique used in other acousto-optic devices, but heretofore has not been extended for use in an AOTF. By choosing an appropriate AOTF transducer electrode design, the acoustic launch angle can be steered as a function of frequency, reducing the tuning frequency at short wavelengths and increasing it at long wavelengths. The consequence of beam steering is to reduce the necessary driving frequency range and allow greater than one octave spectra to be filtered in a single AOTF device.

Figure 4:
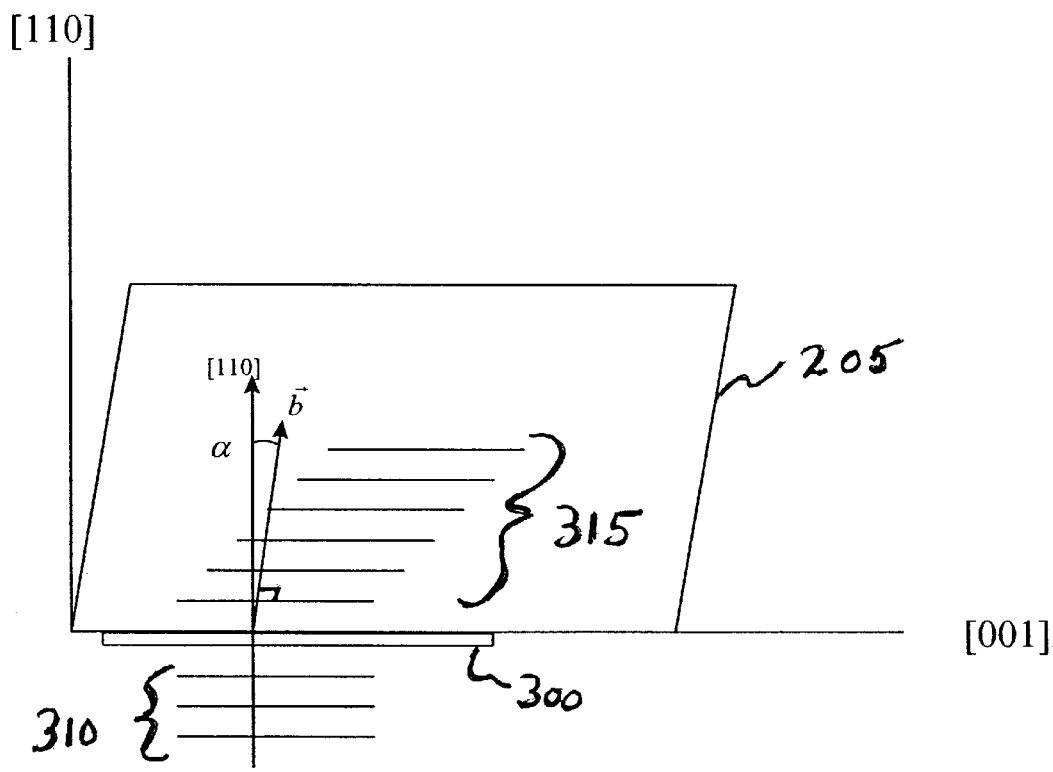
FIG. 4 describes the use of beam-steering with a birefringent crystal.

By applying beam steering to an AOTF, it is possible to change the acoustic launch angle as a function of frequency. Referring now to FIG. 4, an ultrasonic transducer 300 attached to a birefringent crystal block 205 in an AOTF imparts a slow shear to the acoustic energy 310 directed into the birefringent crystal block 205. The direction of the shear wave 315 depends upon the launch angle a with respect to the crystal axis [110], and, as described above, the selection of a particular optical wavelength and tuning frequency range is effected through choice of an appropriate corresponding acoustic launch direction. A conventional AOTF has a fixed launch angle α. Beam steering permits the launch angle α to be varied as a function of the electrical characteristics of the beam steering electrode structure, thereby allowing the reduction of the acoustic launch angle at high frequencies in order to select a shorter wavelength, and, conversely, increasing the acoustic launch angle at low frequencies in order to select a longer wavelength. Combining beam steering into the design of an AOTF thus allows a beam-steered AOTF to cover more than one octave of wavelength with a frequency range of less than one octave.

Figure 2:
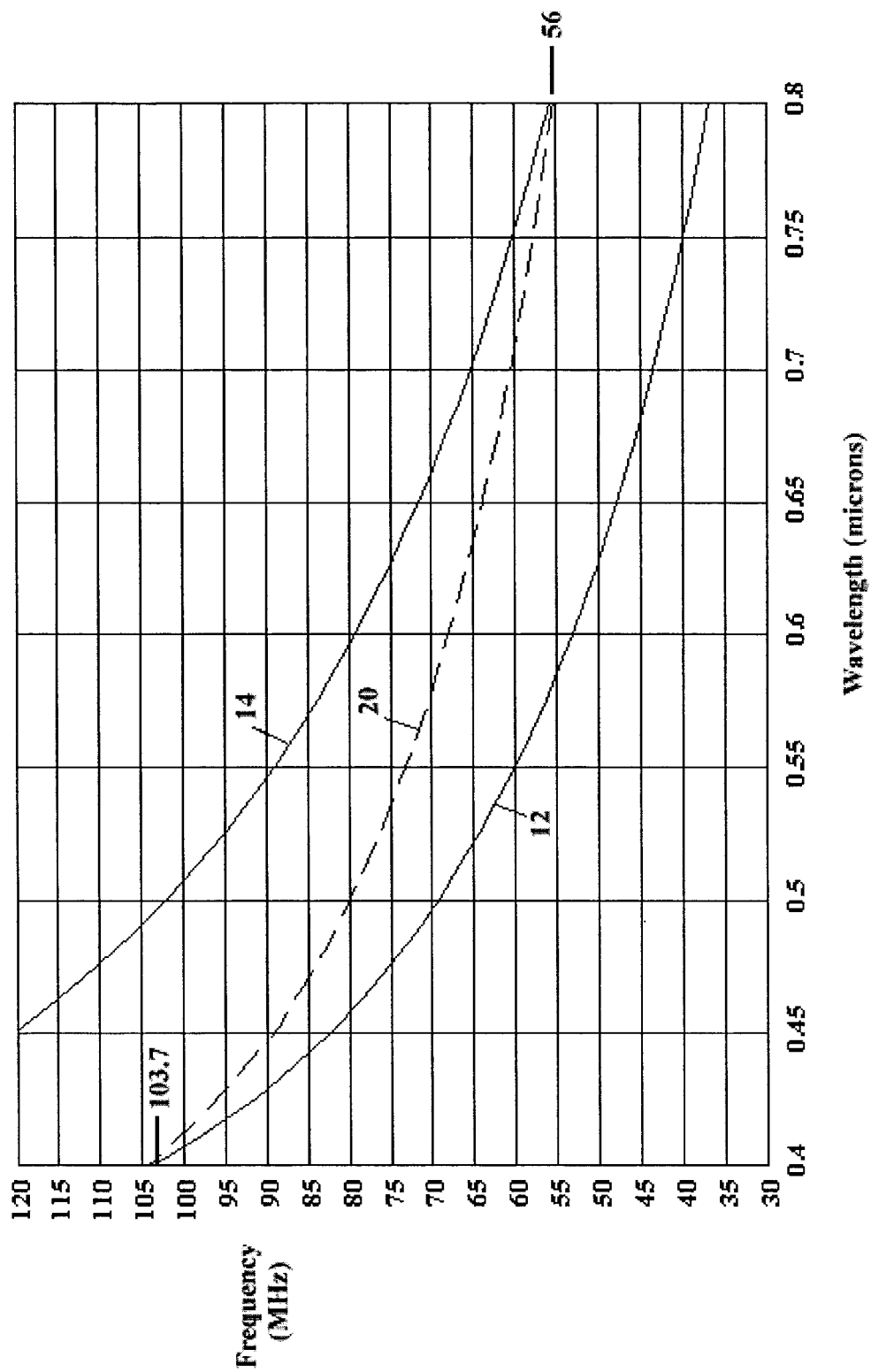
FIG. 2 shows the wavelength range of a beam-steered AOTF according to the present invention.

In a presently preferred embodiment, a beam-steered AOTF 200 provides 2.2° of active beam steering, as illustrated in FIG. 2, thus combining the properties of both fixed launch angle configurations, allowing operation from 400 nm to 800 nm with a 56 MHz to 103.7 MHz tuning range (reference curve 20). The beam-steered AOTF 200 of the present invention provides the capability to cover octave (or more) spectra, including, but not limited to, the entire visible light spectrum, or a similar wavelength range about a spectrum wavelength other than the visible light spectrum, in a single device. This is a significant advance in the usefulness of these devices. Areas of application include, but are not limited to, colorimetry, remote sensing, spectroscopy and fluorimetry.

Figure 3:
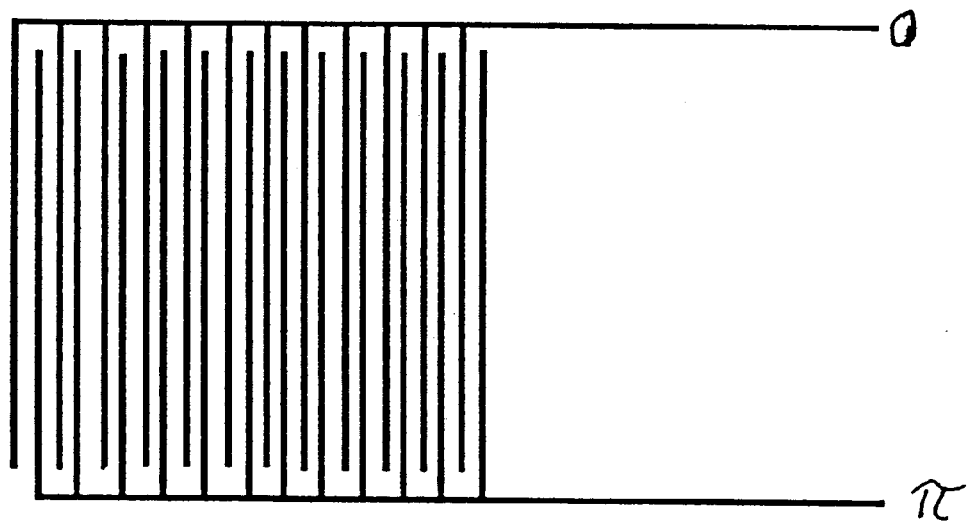
FIG. 3 describes a preferred inter-digital electrode structure of the present invention using a fine grid of metallic fingers placed on the surface of a piezoelectric transducer.

In a presently preferred embodiment, the necessary beam steering is accomplished using an inter-digital electrode structure 100 comprising a fine grid of metallic fingers placed on the surface of the piezoelectric transducer as described in FIG. 3. For such an electrode array of alternating fingers with opposite phase, the beam steering angle is given by:

$$\sin\theta = \frac{V}{2\,fd}$$

where V is the acoustic velocity, f is the frequency and d is the electrode spacing.

For a total steering angle of 2.2° as specified for tuning response 20 of FIG. 2, with a 56 MHz to 103.7 MHz frequency range, an electrode spacing of 75 μm is required for electrode structure 100. At a drive frequency of 110 MHz, the steering angle is 2.2° with a required launch angle of 4.2°, a difference of 2°. This implies that the transducer 300 surface preferably is tilted at 2° from the [110] axis (reference FIG. 5). Making allowance for the changing acoustic velocity with angle, the launch angle at 56 MHz will be 6.4°.

In a presently preferred embodiment, electrode structure 100 comprises interlaced fingers of fine dimension driven in anti-phase as shown in FIG. 3. Each finger preferably has a width of 50 μm (0.002") with a spacing of 75 μm (0.003"). Every other finger is electrically coupled together. Preferably, electrode structure 100 is etched onto the surface of the transducer. The fingers may be aluminum, platinum, gold or other conductive metal. Increasingly finer granularity of finger width and spacing is required in order for electrode structure 100 to provide a correspondingly increasing range of beam steering. The ability to reliably and economically manufacture electrode structure 100 using conventional etching techniques becomes more difficult as the required finger width and spacing decreases. Thus, tilting the transducer 300 surface by 2° relative to the [001] axis in its attachment to birefringent crystal block 205 is preferable in order to reduce the required steering range, and, therefore, increase the required finger width and spacing, associated with electrode structure 100. In a presently preferred embodiment, transducer 300 surface is tilted by 2° to allow the required steering range to be reduced from 4.2° to 2.2°. The 2° tilt is achieved by grinding or milling the corresponding surface of birefringent crystal block 205 to which transducer 300 attaches in order to achieve a 2° displacement. Alternative embodiments comprising other tilting displacements (i.e., more than or less than 2°) fall within the scope of the present invention.

Figure 5:
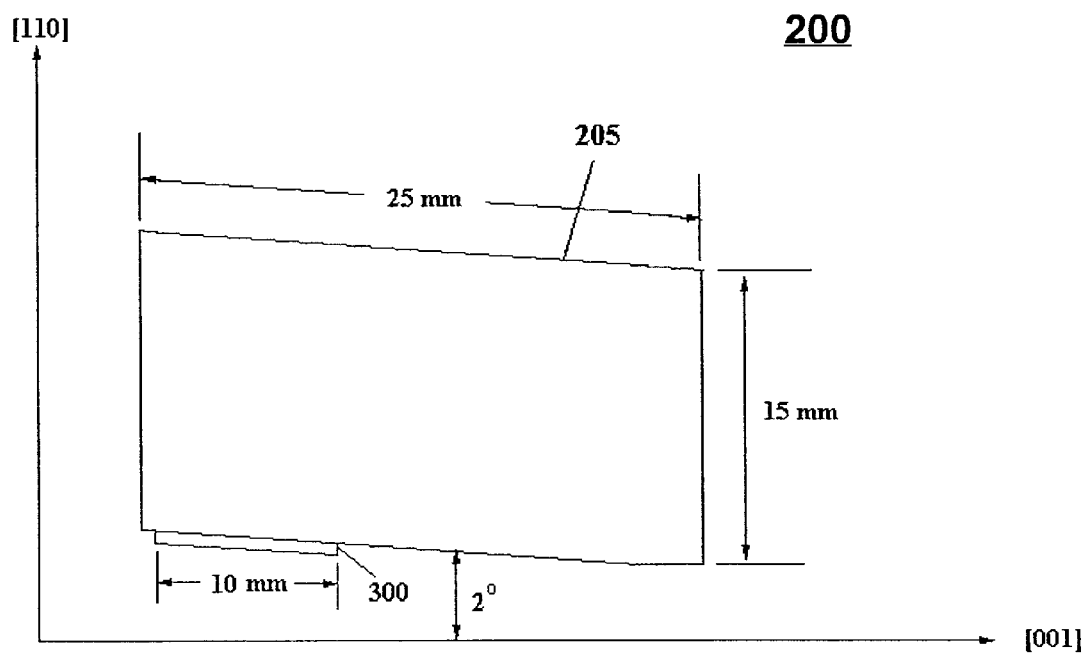
FIG. 5 is a block design of a preferred embodiment of a beam-steered AOTF according to the present invention.
Figure 5:
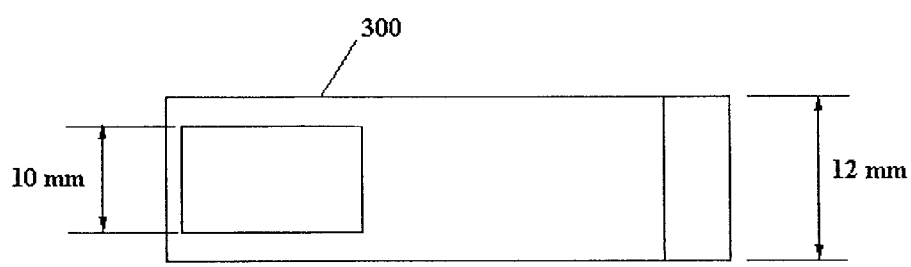

Referring now to FIG. 5, a birefringent crystal block 205 design of beam-steered AOTF 200 comprises a parallelogram in the [110]/[001] plane, with the transducer 300 face preferably inclined at 2° to the [001] plane and with the input preferably parallel to the [110] axis. For an input aperture of 5 mm×5 mm and a 10 mm interaction length, birefringent crystal block 205 is 25 mm long in the [001] direction. This dimension is determined by the need to accommodate the walk-off of the acoustic column.

With a 10 mm electrode length and 10 mm height, beam-steered AOTF 200 yields bandwidths of 2 nm to 5 nm with 200 mW of drive power. The acceptance angle is 2.5° in each axis.

In a presently preferred embodiment, one of two beams generated by electrode structure 100 is directed into birefringent crystal block 205, and the other beam is discarded. The energy associated with the discarded beam embodiment is minimal, its loss having no foreseeable material engineering impact to the design of beam-steered AOTF 200. However, in an alternative embodiment, both beams generated by electrode structure 100 are directed into birefringent crystal block 205 in directions such that the wave vector associated with one beam propagates with phase velocity vector $\vec{b}$ (reference FIG. 4), and the beam that otherwise would be discarded is internally reflected off the internal face of birefringent crystal block 205 at an angle such that the reflected beam energy also propagates with phase velocity vector $\vec{b}$ (reference FIG. 4).

Thus, an apparatus and methods have been shown that combine beam-steering techniques with acousto-optic tunable filter (AOTF) design techniques, thereby increasing the tunable range of a single AOTF device without introducing undesired spurious harmonic responses, and in which the increased tunable range includes, for example, but not limited to, the entire visible light spectrum.

While what has been described above are the presently most preferred embodiments, it should be understood that the invention can take many other forms. For example, the AOTF structure described could be used in other applications, as for example as a modulator, in addition to being used as a filter. Many additions, modifications and alterations can be made without departing from the spirit and scope of the present invention as claimed below.

What is claimed is:

1. A method for increasing the tunable range of a single acousto-optic tunable filter comprising the steps of generating an active steering beam on a piezoelectric transducer by configuring a set electrodes on a piezoelectric transducer to reduce the tuning frequency at short wavelengths and increasing the tuning frequency at long wavelengths and mounting the piezoelectric transducer in relation with an optically transparent crystal at an angle, such that a launch angle equal to or greater than zero, in combination with the driving frequency provides an increased wavelength range to be filtered in the single AOTF.

2. The method of claim 1 wherein the beam-steered AOTF has a wavelength range of filtering in the order of an octave over a driving frequency in the order of an octave.

3. A method of claim 1 wherein the piezoelectric transducer is formed of LiNbO3.

4. The method of claim 3 wherein the electrode are formed as interdigital fingers on the piezoelectric transducer.

5. The method of claim 1 wherein the optically transparent crystal is TeO2.

6. The method of claim 1 wherein the wavelength filtered is between approximately 400 nm and approximately 800 nm for a driving frequency in the range of approximately 103.7 MHz and 56 MHz.

7. The method of claim 1 wherein the piezoelectric transducer is mounted in relation with the optically transparent crystal so that a portion of the driving frequency energy is reflected from a distal face of the optical crystal to form an additive energy for increasing the filtered wavelength range.

8. The method of claim 1 wherein the configuration of the transducer and the driving frequency are impedance matched to approximately 50 Ohms.

9. An apparatus for increasing the tunable range of a single acousto-optic tunable filter comprising generation of an active steering beam on a piezoelectric transducer by configuring a set of electrodes on a piezoelectric transducer to reduce the tuning frequency at short wavelengths and increasing the tuning frequency at long wavelengths and mounting the piezoelectric transducer in relation with an optically transparent crystal at an angle, such that a launch angle equal to or greater than zero, in combination with the driving frequency provides an increased wavelength range to be filtered in the single AOTF.

10. The apparatus of claim 9 wherein the beam-steered AOTF has a wavelength range of filtering in the order of an octave over a driving frequency in the order of an octave.

11. The apparatus of claim 9 wherein the piezoelectric transducer is formed of LiNbO3.

12. The apparatus of claim 11 wherein the electrode are formed as interdigital fingers on the piezoelectric transducer.

13. The apparatus of claim 9 wherein the optically transparent crystal is TeO2.

14. The apparatus of claim 9 wherein the wavelength filtered is between approximately 400 nm and approximately 800 nm for a driving frequency in the range of approximately 103.7 MHz and 56 MHz.

15. The apparatus of claim 9 wherein the piezoelectric transducer is mounted in relation with the optically transparent crystal so that a portion of the driving frequency energy is reflected from a distal face of the optical crystal to form an additive energy for increasing the filtered wavelength range.

16. The apparatus of claim 9 wherein the configuration of the transducer and the driving frequency are impedance matched to approximately 50 Ohms.

* * * * *